United States Patent [19]

Carlson

[11] 4,117,856
[45] Oct. 3, 1978

[54] FROSTPROOF BACKFLOW PREVENTER

[75] Inventor: Donald E. Carlson, Highland Park, Ill.

[73] Assignee: Mark Controls Corporation, Lake Zurich, Ill.

[21] Appl. No.: 726,777

[22] Filed: Sep. 27, 1976

[51] Int. Cl.² .......................................... F16K 24/00
[52] U.S. Cl. .................................... 137/62; 137/218; 137/798; 285/23; 285/39
[58] Field of Search .................. 137/62, 218, 798; 251/148; 285/23, 39

[56] References Cited

U.S. PATENT DOCUMENTS

| | | | |
|---|---|---|---|
| 2,997,054 | 8/1961 | Woodford | 137/218 |
| 3,075,704 | 1/1963 | Stump | 137/62 X |
| 3,294,359 | 12/1966 | Bauer | 251/148 |
| 3,446,226 | 5/1969 | Canterbury | 137/62 |
| 3,459,443 | 8/1969 | Butters et al. | 285/39 |
| 3,543,786 | 12/1970 | Woodford | 137/798 X |
| 3,850,190 | 11/1974 | Carlson | 137/218 |
| 3,952,770 | 4/1976 | Botnick | 137/218 X |

Primary Examiner—Gerald A. Michalsky

[57] ABSTRACT

A backflow preventer in a fluid conduit permits flow from the inlet to the outlet of the preventer when the inlet is pressurized and prevents reverse flow upon termination of flow through the preventer. An apertured diaphragm between the inlet and outlet closes a valve seat between the outlet and a vent passage when the inlet is relatively pressurized. A check member upstream of the diaphragm closes the diaphragm aperture if the outlet is relatively pressurized and maintains the diaphragm aperture closed upon pressurization of the inlet until after closing of the vent valve seat. A second vent communicates with the interior of the preventer and is closed by a portion of the diaphragm upon pressurization of the interior. A relief port in the chamber includes a temperature responsive element that opens the relief port once ambient temperature reaches a preselected level. The inlet includes an internally threaded sleeve within the housing that may be secured to an externally threaded fluid hydrant. The sleeve allows the preventer to be attached to a hydrant, but prevents its removal after a key in the sleeve is removed.

12 Claims, 4 Drawing Figures

FROSTPROOF BACKFLOW PREVENTER

BACKGROUND OF THE INVENTION

A. Field of the Invention

The present invention relates to an automatic self-draining backflow preventer.

B. Description of the Prior Art

Backflow preventers, vacuum breakers, and the like are typically used in fluid systems between a fluid source and a fluid conduit such as a hose for preventing backflow if a decrease of fluid pressure from the fluid source occurs. Such a backflow preventer is disclosed in the U.S. Pat. No. 3,850,190.

Typically, prior art backflow preventers prevent backflow at the outlet of the preventer leaving residual water within the housing of the device. Since the preventer may be installed upon a hydrant on the exterior of a building, this trapped residual water is susceptable to freezing at below freezing ambient temperatures thereby causing damage to the hydrant.

Existing regulations covering the installation of backflow prevention devices require the vacuum breaker to be permanently affixed to the sillcock or hydrant to prevent unauthorized removal. Because this permanent fixture cannot be removed, prior art backflow preventers employ manual means to open a relief port to atmosphere allowing residual water within the preventer to drain from the area immediately upstream of the backflow preventer closure member and downstream from the hydrant. This requires an extra procedure to be performed manually, often resulting in inadequate drainage of the device. Moreover, this procedure is often overlooked resulting in damage to the hydrant and backflow preventer.

In the alternative, some prior art hydrants normally installed in residential buildings employ a separate shut-off valve located at a heated area inside the building. Accordingly, the water may be shut off inside the building and the hydrant opened allowing water to drain. However, these prior art backflow preventers preclude the possibility of drainage of the hydrant unless some means is provided to open the preventer to atmosphere in a manner that will allow purging of the freeze prone water and yet not allow the introduction of contamination.

SUMMARY OF THE INVENTION

An object of the present invention is to provide a new and improved backflow preventer.

Another object of the present invention is to provide a new and improved self-draining backflow preventer.

A further object of the present invention is to provide a new and improved backflow preventer that is automatically self-draining.

Briefly, the present invention is directed to a new and improved backflow preventer for preventing backflow and back siphonage by way of hose connections into a sillcock or hydrant on a residential building or the like. The backflow preventer includes a housing having a fluid inlet and outlet. An annular diaphragm is secured in the housing between the inlet and outlet and includes a central flow opening surrounded by an inner edge of the diaphragm. The diaphragm is flexible and resilient so that it is capable of downstream movement in response to pressurization of the inlet.

The outlet includes a valve seat spaced downstream from the diaphragm is in its relaxed position. Upon downstream movement of the diaphragm, the diaphragm seals against the valve seat. Radially spaced from the outlet and in the housing are a series of vent passages communicating across the valve seat with the outlet passage while the diaphragm is in its relaxed position.

Also included within the housing is a check member positioned upstream of the diaphragm. The check member has a valve surface engageable with the inner edge of the diaphragm in order to prevent flow through the diaphragm opening from outlet to the inlet. Means for limiting the movement of the check member between upstream and downstream positions is also provided in the housing.

In the upstream position of the check member the valve surface engages the inner edge of the diaphragm when the diaphragm is in a relaxed position so that backflow is prevented. As the inlet is pressurized, the check member moves with the diaphragm to the downstream position of the check member in which the diaphragm engages the valve seat to close the vent passages, and in which the valve seat is spaced downstream from the face of the diaphragm. The flexible resilient diaphragm may then move further downstream so that its inner edge moves away from the check member and flow through the central opening of the diaphragm is permitted.

In accordance with an important feature of the present invention, there is a second series of vent passages communicating across the diaphragm with the chamber during the relaxed position of the diaphragm. Upon pressurization of the inlet, the diaphragm closes off this communication with the chamber.

In accordance with a further important feature of the present invention, there is included a relief port fabricated in the housing communicating the chamber with atmosphere. Positioned within this relief port, is a temperature responsive element that opens the relief port once ambient temperature reaches a preselected level; preferrably, a temperature higher than the freezing temperature of water.

Once the sillcock or hydrant is closed, the backflow preventer and diaphragm prevent back siphonage. If the ambient temperature drops below the preselected temperature level, the control device opens the relief port dissipating hydrostatic pressure trapped in the chamber upstream of the diaphragm and downstream of the inlet. This reduction of hydrostatic pressure allows the diaphragm to move towards its relaxed position opening the second vent passage and allowing the fluid trapped in the chamber to drain through the vent passage thus preventing freezing of the trapped fluid.

BRIEF DESCRIPTION OF THE DRAWINGS

The above and other objects and advantages and novel features of the present invention will become apparent from the following detailed description of preferred embodiments of the invention illustrated in the accompanying drawings wherein.

Figure 1:
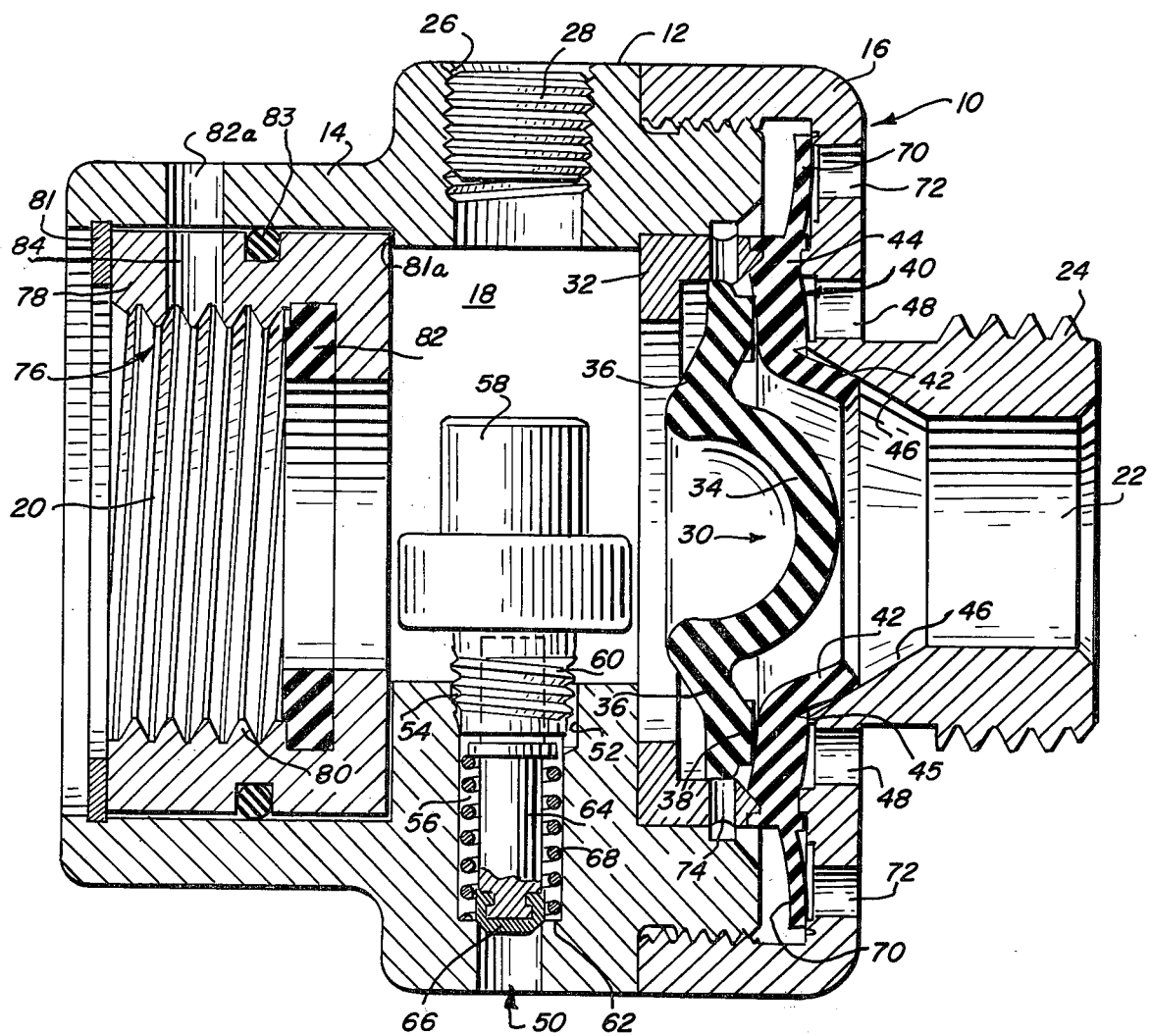
FIG. 1 is a sectional view of a backflow preventer in accordance with the present invention in the full open position.
Figure 2:
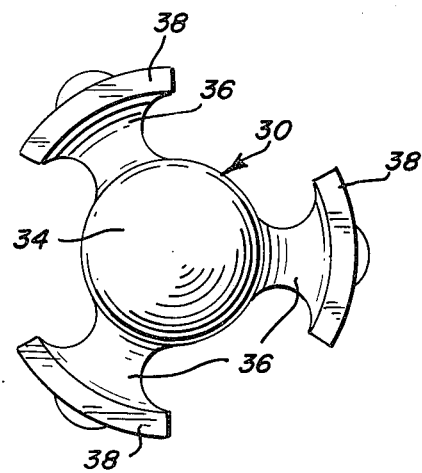
FIG. 2 is an elevational view from the downstream side, of a check member for use with the backflow preventer of FIG. 1.
Figure 3:
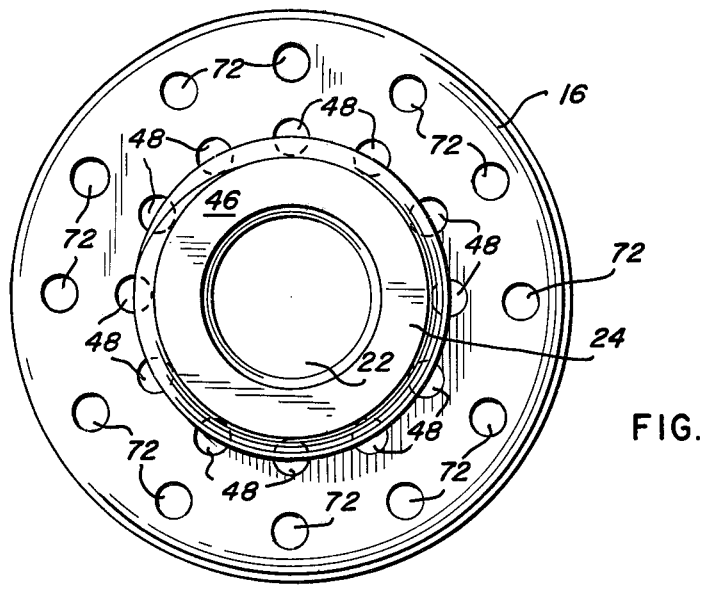
FIG. 3 is an end view of the backflow preventer taken from the right or outlet end as viewed in FIG. 1.

With reference now to FIGS. 1-4, there is illusstrated a backflow preventer constructed in accordance with the principles of the present invention and designated as a whole by the reference numeral 10.

In general, the backflow preventer 10 includes a housing 12 having a main body 14 and an end cap 16 that define an interior chamber 18. Fluid enters and exits the housing 12 through an inlet 20 and an outlet 22, respectively. The inlet 20 is adapted to be connected to a fluid source such as a wall hydrant or sillcock in a manner to be described. The outlet 22 is defined by the end cap 16 which includes external threads 24 allowing the preventer 10 to be connected to a fluid conduit such as a hose. There is also fabricated in the main body 14 an access port 26 to allow access to the chamber 18 for cleaning or other requirements. The port 26 is closed by a plug 28 when access to the chamber 18 is not necessary.

In order to prevent back flow from outlet 22 to the inlet 20, the preventer 10 also includes a movable check member 30 that is retained within the chamber 18 by a retaining member 32. The check member 30 includes a central portion 34 and a plurality of legs 36. Each leg 36 includes a rim 38 defined at its outer extremity. The check member 30 interacts with a diaphragm generally designated as 40 and more particularly with the inner peripheral region 42 of the diaphragm 40 to control fluid flow through the preventer 10 and to prevent back flow. Diaphragm 40 includes an intermediate portion 44 that is secured between the end cap 16, and retaining member 32, thereby fixing diaphragm 40 within the backflow preventer 40.

A specific description of the operation of the check member 30 in combination with the inner portion 42 to control flow and backflow is set forth in U.S. Pat. No. 3,850,190 assigned to the same assignee as the present invention. This United States Patent is incorporated herein by reference. Briefly, during operation of the backflow preventer 10, inlet 20 is pressurized due to the introduction of fluid. Fluid passing through the backflow preventer 10 applies pressure to the upstream side of the check member 30 causing the check member 30, the intermediate portion 44, and the inner pheripheral region 42 of the diaphragm 40 to move in a downstream direction (FIG. 1). The rims 38 on the legs 36 are of a sufficient transverse dimension that as the rims 38 abut against the region 44 they serve to stop further downstream movement of the check member 30. The downstream movement of the intermediate region 44 continues until it seals against a valve seat 45 defined at the leading edge of the inclined entrance 46 to the outlet 22.

Figure 4:
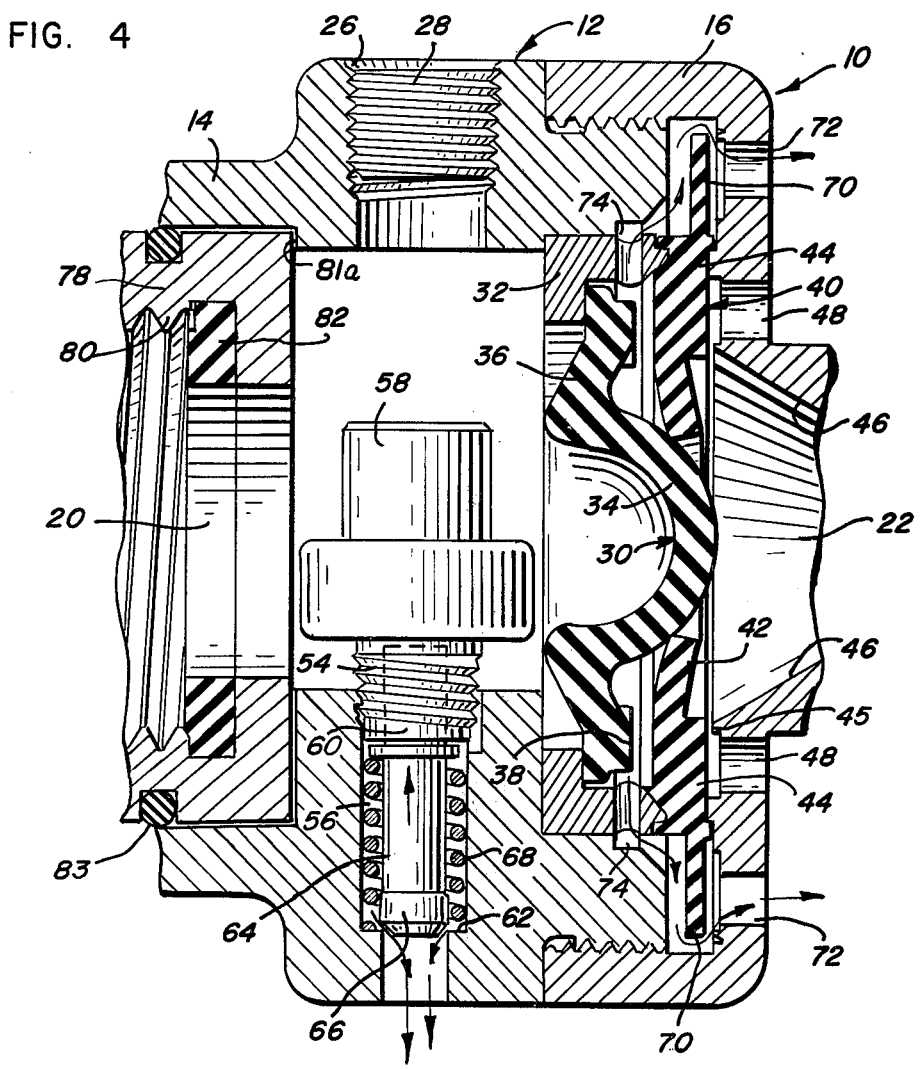
FIG. 4 is a partial, sectional view of a backflow preventer in a no flow position during draining of the inner chamber.

Upon termination of flow through the preventer 10, the natural resiliency of the diaphragm 40 returns the check member 30 and the diaphragm 40 to their normal position (FIG. 4). Since in the normal position the inner portion of diaphragm 42 seals against the central portion 34 of the check member 30 preventing backflow around the legs 36, several drain passages 48 are fabricated in end cap 16 adjacent to the valve seat 46. Flow through the passages 48 is controlled by the intermediate portion 44 of the diaphragm 40. More specifically, during flow through the preventer 10, the portion 44 seals against the passages 48 at the seat 45 preventing flow therethrough (FIG. 1). Upon termination of flow through the preventer 10, the diaphragm 40 returns to its relaxed position opening passages 48 (FIG. 4). In this latter configuration, fluid trapped in the outlet 22 downstream of member 30 and any back flow may be drained through passages 48.

Although back flow from a conduit secured to outlet 22 and any fluid trapped down stream of member 30 is drained in the above-described manner, additional fluid is trapped within chamber 18. If the ambient temperature drops to freezing or below, the trapped fluid within chamber 18 is subject to freezing resulting in damage to the backflow preventer 10.

In accordance with an important feature of the present invention, the housing 12 has fabricated therein a relief port 50 that communicates the chamber 18 with atmosphere. The relief port 50 is of a stepped configuration having at the upper end a relatively larger bore 52 having internal threads 54. Below bore 52 there is also fabricated a cavity 56.

The relief port 50 is of an area substantially less than the total area of the drain passages 48. This smaller area of the relief port 50 is intentional in order to preclude large amounts of water wastefully passing through the relief port 50 during opening, for the relief port 50 is intended to relieve or reduce the hydrostatic pressure of the fluid trapped within the chamber 18 and is not intended to drain the chamber 18 of fluid.

Relief of the hydrostatic pressure within chamber 18 through relief port 50 is controlled by a temperature sensing element 58. The element 58 is illustrated in the preferred embodiment as a wax-filled power element but may also be a bimetal actuator or similar temperature sensitive device. The temperature sensing element 58 includes an externally threaded extension 60 adapted to be threaded into the threads 54 of bore 52. Threads 54 are of a slightly larger size and pitch than the threads on extension 60. In this manner, sufficient space is provided to allow fluid, under the influence of hydrostatic pressure established within chamber 18, to pass along the threads and enter the cavity 56. Cavity 56 communicates across a valve seat 62 defined in the lower end of relief port 50 to the atmosphere.

Extending from the power element 58 is a stem 64 having mounted on the lower end thereof a valve member 66 intended to engage the seat 62. The stem 64 is biased in an upward direction by the spring 68 mounted in cavity 56, but when the ambient temperature is above a preselected temperature that is above the freezing temperature of the fluid passing through the backflow preventer 10, or during flow through the backflow preventer 10, stem 64 is extended as a result of the expansion of power element 58 to a position such that valve member 66 sealingly engages seat 62. As the ambient temperature drops below the preselected temperature, the power element 36 contracts and the stem 64 under the influence of the spring 68 rises and disengages the valve member 66 from the seat 62 thereby venting the hydrostatic pressure in chamber 18.

In accordance with another important feature of the present invention, the elastomeric diaphragm 40 further includes an outer peripheral portion 70. The portion 70 is of a lesser thickness than inner portion 42. Accordingly, although the hydrostatic pressure of the fluid trapped within chamber 18 does not create sufficient force to prevent inner portion 42 from resuming its relaxed position and opening the drain ports 48 (FIG. 4), this pressure in chamber 18 is sufficient to maintain the thinner outer portion 70 in sealing engagement with a plurality of drain ports 72 fabricated in the end cap 16.

The drain ports 72 communicate with a plurality of internal ports 74 fabricated in the retaining member 32 which communicate ports 72 across the diaphragm 40 to the inner chamber 18 through the legs 36 of the member 30 when inlet 20 is not pressurized. When fluid flows through the backflow preventer 10 and out outlet 22 in a manner previously described, fluid pressure passes through internal passages 74 flexing the outer peripheral region 70 to a sealing position against the passages 72 preventing fluid flow therethrough. If the pressure at the inlet 20 is reduced at or below the pressure at the outlet 22, the inner peripheral portion 42 moves to it relaxed position (FIG. 4) communicating the vent passages 48 with the outlet 22. In this closed condition, the hydrostatic pressure within chamber 18 developed by the trapped fluid maintains the outer portion 70 of the diaphragm 40 in sealing engagement with the ports 72 thus preventing draining of the trapped fluid.

If in this configuration ambient temperature is above the preselected temperature level and thus above freezing, the stem 64 of the power element 58 is in a position such that the relief port 50 is sealed by the sealing engagement of the valve element 66 with the seat 62. However, if the ambient temperature drops below the preselected temperature near or below the freezing temperature of the fluid within the chamber 18, the power element 58 contracts raising the stem 64 and communicating the relief port 50 with the chamber 18. As this occurs, a small amount of fluid is allowed to pass along the threads 54 and out the port 50 thus reducing the hydrostatic pressure within chamber 18. The outer peripheral portion 70 of the diaphragm 40 then returns to its relaxed position communicating the vent passages 72, with the inner chamber 18 through the internal passages 74. The total area of the vent passages 72 is substantially larger than the area of port 50, thus the fluid in chamber 18 rapidly drains out the vent passages 72 completely draining the chamber 18 of fluid. Accordingly, there is little or no fluid within the chamber 18 to freeze thus preventing damage to the backflow preventer 10.

In accordance with a further important feature of the present invention, the main body 14 includes a tamperproof mounting arrangement 76 for connecting the inlet 20 and the backflow preventer 10 to a source of fluid. The mounting arrangement 76 includes a sleeve 78 having internal threads 80 for connecting the sleeve 78 to a fluid supply such as the outlet fitting of a hydrant or sillcock. The sleeve 78 is mounted in the main body 14 between annular ring 81 and shoulder 81a thereby allowing the sleeve 78 to rotate within the main body 14. Gasket 82 is provided within sleeve 78 for sealing against the end of the hydrant or sillcock. An O-ring 83 is mounted around the sleeve 78 to prevent leakage between the body 14 and the sleeve 78. To mount the backflow preventer 10 on a hydrant, a key or pin (not shown) is inserted through an aperture 82a fabricated in the main body 14 once it is aligned with an aperture 84 fabricated in the sleeve 78 thereby locking the sleeve 78 relative to the main body 14. After the backflow preventer 10 is rotated so as to thread the sleeve 78 onto the hydrant, the key or pin may be removed from the apertures 82a, and 84; and, thereafter, if the housing 12 is rotated, such rotation does not turn the inner sleeve 78 thus preventing disconnection of the backflow preventer 10 from the hydrant.

If the backflow preventer 10 is to be removed from the hydrant, the pin or key may be reinserted through the aligned apertures 82a and 84 so that the preventer 10 is again locked relative to the sleeve 78. In this manner, turning the preventer 10 also turns the sleeve 78 disconnecting the backflow preventer 10 from the hydrant.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A backflow preventer comprising in combination:
    a housing defining an inlet and an outlet and a chamber between said inlet and said outlet;
    pressure operated valve means mounted within said housing between said chamber and said outlet for preventing flow from said chamber to said outlet when inlet pressure does not exceed outlet pressure;
    a plurality of drain passage means extending from said chamber to the exterior of said housing;
    check valve means for closing said drain passage means when pressure within said chamber exceeds pressure exterior of said housing; a relief port in said housing for establishing communication between said chamber and atmosphere, relief valve means closing said port when ambient temperature is above a predetermined condition, and temperature responsive means for opening said relief valve means to vent said chamber to atmosphere in response to ambient temperature reaching said predetermined temperature condition, said check valve means opening at least some of said drain passage means in response to venting of said chamber to atmosphere, whereby fluid within said chamber may flow outwardly therefrom through said opened drain passage means.

2. A backflow preventer as claimed in claim 1 said temperature responsive means comprising a wax-filled power element.

3. A backflow preventer as claimed in claim 2 said power element positioned within an aperture fabricated in said housing in fluid communication with said chamber.

4. A backflow preventer as claimed in claim 1 further including means for mounting said preventer to a fluid source, said mounting means comprising an internally threaded sleeve rotatably positioned within said inlet, a first aperture in said sleeve, a second aperture in said housing, and a locking member removably positioned in said apertures.

5. A backflow preventer comprising a housing including an inlet, an outlet, and a chamber between said inlet and said outlet;
    an annular, resilient diaphragm having an inner peripheral region, an intermediate region and an outer peripheral region; said intermediate region fixed to said housing between said inlet and said outlet, said diaphragm being responsive in a downstream direction from a relaxed position upon pressurization of said inlet,
    a valve seat surrounding said outlet and downstream of said diaphragm,
    a first vent passage spaced radially from said valve seat and communicating across said valve seat and said outlet in the relaxed position of said diaphragm, a second vent passage communicating across said diaphragm and said chamber in the relaxed position of said diaphragm, a check member disposed upstream of said diaphragm having a valve surface engageable with said inner region, a relief port in said chamber, and a temperature sensitive controller for controlling communication of said chamber with said relief port.

6. The backflow preventer of claim 5, said outer peripheral region of said diaphragm closing said second vent passage upon pressurization of said inlet.

7. The backflow preventer of claim 5 said inner peripheral region sealing said first vent passage upon pressurization of said inlet.

8. The backflow preventer of claim 5, said relief port being of a smaller area than said second vent passage.

9. The backflow preventer of claim 5 said temperature sensitive controller positioned in at least a portion of said relief port, and responsive to a preselected ambient temperature to open said relief port.

10. The backflow preventer of claim 5 wherein said controller comprises a wax-filled power element.

11. A backflow preventer as set forth in claim 5 and further including a securement member for securing said preventer to a source of fluid, said member including a sleeve coaxially and rotatably disposed in said inlet.

12. The backflow preventer claimed in claim 11 wherein said securement member further comprises a first aperture in said housing adjacent said inlet, a second aperture in said sleeve, and a locking device removably positioned within said first and second apertures for locking said sleeve relative to said housing.

* * * * *